(12) United States Patent
Choi et al.

(10) Patent No.: US 12,338,801 B2
(45) Date of Patent: *Jun. 24, 2025

(54) CONTROL METHOD OF AERO WIND POWER GENERATION DEVICE

(71) Applicants: Hyundai Motor Company, Seoul (KR); Kia Corporation, Seoul (KR)

(72) Inventors: Jung Hun Choi, Hwaseong-Si (KR); Dong Hyun Ha, Seoul (KR); Jae Wung Jung, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 272 days.

This patent is subject to a terminal disclaimer.

(21) Appl. No.: 17/980,326

(22) Filed: Nov. 3, 2022

(65) Prior Publication Data
US 2023/0250805 A1 Aug. 10, 2023

(30) Foreign Application Priority Data
Feb. 4, 2022 (KR) .................. 10-2022-0014625

(51) Int. Cl.
*F03D 9/32* (2016.01)
*B60L 8/00* (2006.01)
(Continued)

(52) U.S. Cl.
CPC .............. *F03D 9/322* (2023.08); *B60L 8/006* (2013.01); *B60L 53/52* (2019.02); *B60L 53/57* (2019.02);
(Continued)

(58) Field of Classification Search
CPC . F03D 9/322; F03D 9/32; B60L 8/006; B60L 53/52; B60L 53/57; B64B 1/58; B64C 39/024; B64D 27/24; G05D 1/101; G05D 1/661; G05D 1/678; G05D 2105/57; B64U 10/30; B64U 50/19; B64U 50/34;
(Continued)

(56) References Cited

U.S. PATENT DOCUMENTS 6,325,330 B1 * 12/2001 Lavan, Jr. .............. D07B 1/147
244/33
9,589,448 B1 * 3/2017 Schneider ................ F41H 9/10
(Continued)

FOREIGN PATENT DOCUMENTS

KR 20210029868 A * 3/2021 .......... B64C 39/024
WO WO-2020159402 A1 * 8/2020 ............... F03D 5/00

OTHER PUBLICATIONS

Translation of KR-20210029868-A, 11 pages (Year: 2021).*

*Primary Examiner* — Dale W Hilgendorf
(74) *Attorney, Agent, or Firm* — Morgan, Lewis & Bockius LLP (57) ABSTRACT

A method of controlling an aero wind power generation device, includes take-off preparation process of preparing for take-off of the aero wind power generation device; a gas injection process of injecting gas into a buoyancy generation unit of the aero wind power generation device; a take-off process of taking off the aero wind power generation device using a drone unit and the buoyancy generation unit of the aero wind power generation device; and a charging process of charging a battery connected to the aero wind power generation device using the aero wind power generation device.

20 Claims, 5 Drawing Sheets

(51) Int. Cl.
*B60L 53/52* (2019.01)
*B60L 53/57* (2019.01)
*B64B 1/58* (2006.01)
*B64D 27/24* (2024.01)
*B64U 10/30* (2023.01)
*B64U 50/19* (2023.01)
*B64U 50/34* (2023.01)
*B64U 101/10* (2023.01)
*G05D 1/00* (2024.01)
*G05D 1/661* (2024.01)
*G05D 1/678* (2024.01)
*G05D 105/00* (2024.01)

(52) U.S. Cl.
CPC ............... *B64B 1/58* (2013.01); *B64D 27/24* (2013.01); *B64U 10/30* (2023.01); *B64U 50/19* (2023.01); *B64U 50/34* (2023.01); *F03D 9/32* (2016.05); *G05D 1/101* (2013.01); *G05D 1/661* (2024.01); *G05D 1/678* (2024.01); *B64U 2101/10* (2023.01); *B64U 2201/202* (2023.01); *F05B 2240/941* (2013.01); *G05D 2105/57* (2024.01)

(58) Field of Classification Search
CPC .......... B64U 2101/10; B64U 2201/202; F05B 2240/941
See application file for complete search history.

(56) References Cited

U.S. PATENT DOCUMENTS

| | | | |
|---|---|---|---|
| 10,661,878 B1* | 5/2020 | Bonang | B64U 70/50 |
| 10,800,505 B1* | 10/2020 | Edsinger | B64B 1/40 |
| 10,844,839 B2* | 11/2020 | Von Flotow | B64U 10/60 |
| 10,894,591 B2* | 1/2021 | Egan | B64B 1/38 |
| 10,926,876 B2* | 2/2021 | Kozak | G08G 1/054 |
| 11,873,124 B2* | 1/2024 | Choi | F03D 9/32 |
| 12,018,650 B2* | 6/2024 | Choi | F03D 5/00 |
| 2007/0200027 A1* | 8/2007 | Johnson | B64U 30/26 244/3.1 |
| 2010/0107627 A1* | 5/2010 | Morgan | B63B 35/44 114/294 |
| 2011/0049992 A1* | 3/2011 | Sant'Anselmo | H02S 10/12 307/64 |
| 2016/0056621 A1* | 2/2016 | Patten | G02B 6/4416 174/40 R |
| 2016/0273519 A1* | 9/2016 | Vander Lind | B64F 3/02 |
| 2016/0318607 A1* | 11/2016 | Desai | A01M 7/00 |
| 2017/0190444 A1* | 7/2017 | Hundemer | B64F 3/00 |
| 2018/0304981 A1* | 10/2018 | Piette | B64C 39/024 |
| 2019/0359329 A1* | 11/2019 | Gavrilov | B64C 39/024 |
| 2020/0361632 A1* | 11/2020 | Ghosh | B64C 39/022 |
| 2020/0369375 A1* | 11/2020 | Leone | B64C 39/024 |
| 2022/0144429 A1* | 5/2022 | Warner, IV | B64C 27/39 |

* cited by examiner

CONTROL METHOD OF AERO WIND POWER GENERATION DEVICE

CROSS-REFERENCE TO RELATED APPLICATION

The present application claims priority to Korean Patent Application No. 10-2022-0014625, filed on Feb. 4, 2022, the entire contents of which is incorporated herein for all purposes by this reference.

BACKGROUND OF THE PRESENT DISCLOSURE

Field of the Present Disclosure

The present disclosure relates to a method of controlling an aero wind power generation device.

Description of Related Art

The description in the present section merely provides background information related to the present disclosure and does not necessarily constitute the related art.

Environmentally friendly vehicles such as electric vehicles are being developed and commercialized. Charging electric vehicles takes longer to charge than filling internal combustion engine vehicles with fuel. Nevertheless, in the case of passenger cars, they may be charged at charging stations typically found in parking lots of buildings or the like, while they are not in use (for example, at night).

On the other hand, commercial trucks are usually parked in remote areas on the outskirts of cities, which makes it hard to charge vehicles at charging stations when they are not in use (for example, at night). Also, there is no way to get electric power even if a self-charging cable is available because charging stations are hard to find on the outskirts of cities, and even if charging stations are provided outside of town, in terms of practicality, it is difficult for a commercial truck to always drive toward the predetermined places to charge.

In general, the wind gets faster with altitude, and as the wind speed increases, wind power generation produces more electrical energy. Wind power generation at lower altitudes cannot produce enough electrical energy. Another problem is that the production of constant amounts of electrical energy depends on external variables such as weather conditions.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling an aero wind power generation device, the method including: a take-off preparation process of preparing for take-off of the aero wind power generation device; a gas injection process of injecting gas into a buoyancy generation unit of the aero wind power generation device; a take-off process of taking off the aero wind power generation device using a drone unit and the buoyancy generation unit of the aero wind power generation device; and a charging process of charging a battery connected to the aero wind power generation device using the aero wind power generation device.

According to at least one aspect, the present disclosure provides a method of controlling an aero wind power generation device, the method including: an information detection process of detecting information for control of the aero wind power generation device; a tension determination process of determining whether tension of a cable of the aero wind power generation device is higher than a preset tension value; and a movement process of moving the aero wind power generation device when it is determined that the tension is higher than the preset tension value.

According to at least one aspect, the present disclosure provides a method of controlling an aero wind power generation device, the method including: a landing determination process of determining whether the aero wind power generation device has landed; a landing preparation process of preparing the aero wind power generation device to land on a housing; and a landing process of landing the aero wind power generation device on the housing.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An aero wind power generation device according to various exemplary embodiments of the present disclosure may allow vehicles to be charged at all times by converting wind power energy into electrical energy.

An aero wind power generation device according to various exemplary embodiments of the present disclosure may produce electrical energy by use of high-altitude, high-speed winds and moving in accordance with weather conditions.

The aspects of the present disclosure are not limited to the foregoing, and other aspects not mentioned herein will be able to be clearly understood by those skilled in the art from the following description.

Hereinafter, some exemplary embodiments of the present disclosure will be described in detail with reference to the accompanying drawings. In the following description, like reference numerals designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 1:
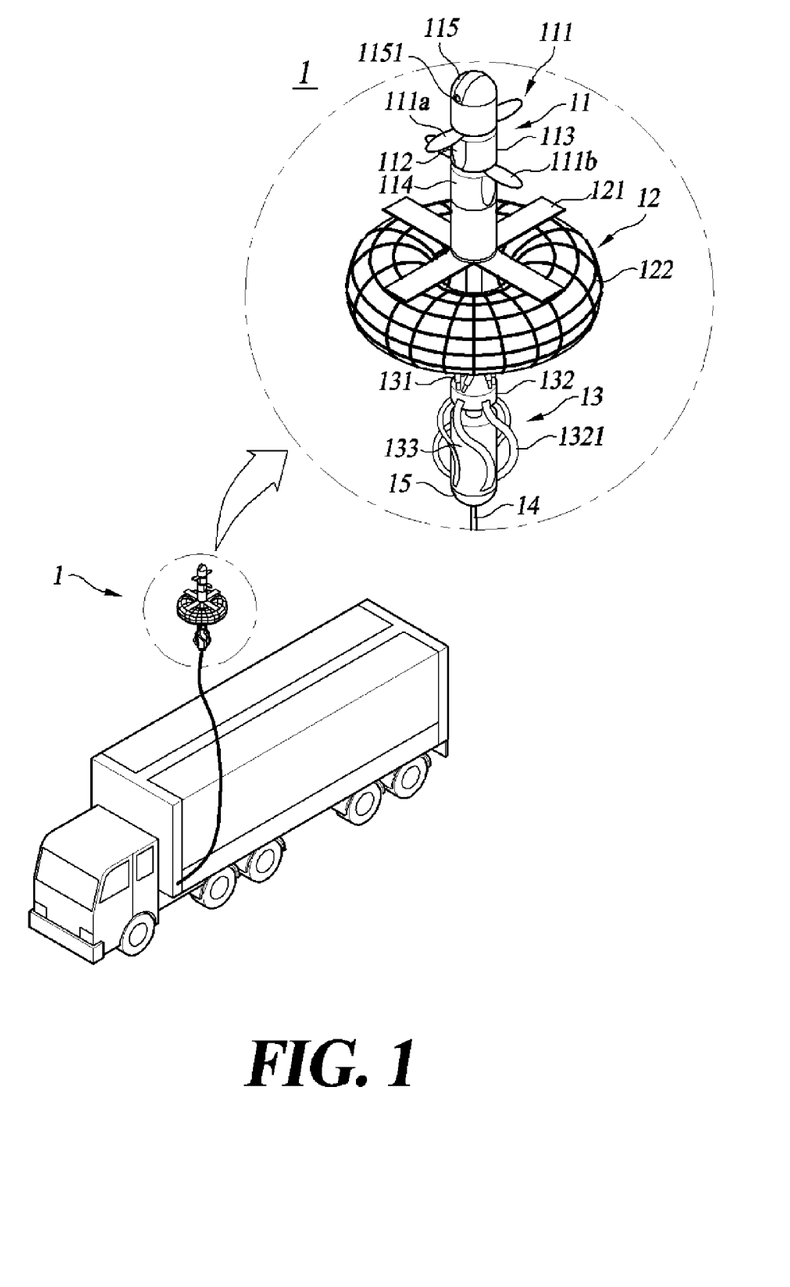
FIG. 1 is a perspective view of how an aero wind power generation device is coupled according to an exemplary embodiment of the present disclosure.

FIG. 1 is a perspective view of how an aero wind power generation device is coupled according to various exemplary embodiments of the present disclosure.

Referring to FIG. 1, an aero wind power generation device 1 according to various exemplary embodiments of the present disclosure may include all or part of a drone unit 11, a buoyancy generation unit 12, a power generation unit 13, a cable 14, and a magnet 15.

The aero wind power generation device 1 may convert wind energy into electrical energy in the air, and charge a vehicle's battery directly by use of the electrical energy and transmit produced electrical energy to a plant or a charging station. Thus, a vehicle provided with the aero wind power generation device 1 does not have to be driven to a charging station and therefore may be charged anywhere regardless of location. Also, the plant or charging station may use the electrical energy produced by the aero wind power generation device 1 in a variety of ways, including for selling the energy or producing hydrogen through water electrolysis using electrical energy and selling it.

The aero wind power generation device 1 may produce electrical energy by use of good quality wind at or below a critical altitude of 150 m. It is possible to efficiently produce electrical energy within a short time period by use of high-altitude, high-speed winds. Also, the aero wind power generation device 1 may move in terms of altitude and location depending on external variables such as weather conditions, for efficient production of electrical energy.

For the aero wind power generation device 1 to produce electrical energy, the drone unit 11 may control the aero wind power generation device 1 so that the aero wind power generation device 1 takes off and hovers. Hovering refers to the state in which an aircraft, a drone, etc. stays in the same position at a certain altitude.

The buoyancy generation unit 12 may assist the drone unit 11 in controlling the aero wind power generation device 1 to take off and hover. The buoyancy generation unit 12 may cause the aero wind power generation device 1 to float by use of a gas including a lower density than air, such as helium gas.

The power generation unit 13 may convert wind energy caused by a wind up in the air. It may convert wind energy into rotational kinetic energy and convert the rotational kinetic energy into electrical energy. Electrical energy produced by the power generation unit 13 may be transmitted to a vehicle, a plant, or a charging station by use of the cable 14. One end portion of the cable 14 may be connected to the aero wind power generation device 1, and the other end portion may be connected to a housing such as a vehicle, a plant, or a charging station. The cable may be flexible type to minimize damage from weather events.

The aero wind power generation device 1 may be in the shape of a pillar in which the drone unit 11, the buoyancy generation unit 12, the power generation unit 13, and the magnet 15 are sequentially coupled from the top. The magnet 15 may be coupled to a bottom portion of the power generation unit 13, that is, an end portion of the aero wind power generation device 1, so that the aero wind power generation device 1 is docked to a vehicle, a plant or a charging station. The shape and order of coupling of the aero wind power generation device 1 are not limited to this, and may be coupled in various ways as needed. For example, it is also possible to change the positions of the drone unit 11 and the buoyancy generation unit 12 to be coupled.

The drone unit 11 may include all or part of drone wings 111, wing grooves 112, drone motors 113, a battery unit 114, a sensor unit 115, and a drone controller.

The drone wings 111 may have a multi-rotor structure including a pair of first drone wings 111a and a pair of second drone wings 111b. The pair of first drone wings 111a may be coupled in such a way as to have a phase difference of 90 degrees from the pair of second drone wings 111b. Depending on the hovering performance required, the drone unit 11 may include one to eight pairs of drone wings 111.

The drone wings 111 may be configured to spread when the aero wind power generation device 1 takes off or hovers and to be collapsible while coupled to a vehicle or the like. A plurality of wing grooves 112 may be formed on one side of the drone unit 11 so that the drone wings 11 are collapsible therein. The wing grooves 112 may be formed at a predetermined depth on one side of the drone unit 11, corresponding to the number and shape of the drone wings 111.

The drone motors 113 may include a first drone motor configured to control the first drone wings and a second drone motor configured to control the second drone wings. The drone motors 113 may control the drone wings 111 so that the aero wind power generation device 1 takes off, hovers, and travels.

The battery unit 114 may include a plurality of batteries configured to supply electric power to the drone motors 113. The batteries may be high-density lithium polymer batteries with a voltage rating of 3.7 V, and 6-cell lithium polymer batteries may be mounted on the battery unit 114.

The sensor unit 115 may include all or part of a camera 1151, a hygrometer, a wind gauge, an accelerometer, a gyro, and an ultra-wide band (UWB) sensor.

The camera may detect objects around the aero wind power generation device 1 to prevent collision with surrounding objects. The camera may be coupled at the top portion of the drone unit 11 to rotate 360 degrees. The hygrometer may monitor humidity with respect to the altitude of the aero wind power generation device 1. The wind gauge may assist in controlling blades 1321 and a reducer of the power generation unit 13 by monitoring wind strength. The accelerometer and the gyro may provide a target hovering value for the aero wind power generation device 1 in preparation for weather conditions (e.g., strong wind) by measuring the acceleration of the aero wind power generation device 1. The UW B sensor may measure the position of the aero wind power generation device 1 so that the aero wind power generation device 1 makes an accurate landing.

The drone controller may be configured to control the drone unit 11 by use of information detected by the sensor unit 115. For example, the drone controller may use information detected by the sensor unit 115 and control the drone wings 111 and the drone motors 113, for the aero wind power generation device 1 to take off, hover, and move.

The buoyancy generation unit 12 may include all or part of a side cover 121 and a balloon 122.

The side cover 121 may be configured to open or close as the aero wind power generation device 1 takes off and lands. The side cover 121 may be configured so that the external side of the buoyancy generation unit 12 opens or closes in four sections. All or part of the sections of the side cover 121 may be opened when necessary. The side cover 121 may be opened as it spreads out over the buoyancy generation unit 12. However, the present disclosure is not limited thereto, and the side cover 121 may be opened by spreading downward of the buoyancy generation unit 12.

A gas lighter than air, such as helium gas, may be injected into the balloon 122. When the aero wind power generation device 1 takes off or hovers, the balloon 122 may be filled up with helium gas. The balloon 122 filled with helium gas may assist the aero wind power generation device 1 in saving energy consumed for take off and hovering of the aero wind power generation device 1. The buoyancy generation unit 12 may further include a gas inlet for injecting helium gas into the balloon 122 and a gas outlet for releasing helium gas. Also, the balloon 122 may be made of a urethane material with high durability to prevent damage from a weather condition or collision with other objects.

The balloon 122 may be disposed inside the side cover 121, and when the aero wind power generation device 1 takes off, the side cover 121 may be opened, and helium gas may be injected into the balloon 122. When the aero wind power generation device 1 lands, the helium gas may be released from the balloon 122, and the side cover 121 may be closed. The volume of the balloon 122 may be so that the balloon 122 filled up with helium gas has a buoyancy greater than the weight of the aero wind power generation device 1.

The power generation unit 13 may include all or part of a blade control unit 131, a rotating unit 132, and a motor unit 133.

The blade control unit 131 may be coupled to a bottom portion of the buoyancy generation unit 12, and the rotating unit 132 and the motor unit 133 may be sequentially coupled to a bottom portion of the blade control unit 131. As the rotating unit 132 coupled to the blades 1321 rotates by wind, wind energy may be converted into rotational kinetic energy. The rotating unit 132 may transfer the rotational kinetic energy to the motor unit 133, and the motor unit 133 may convert the rotational kinetic energy into electrical energy. In the present instance, the blade control unit 131 may control the heights, surface areas, and angles of the blades 1321 and the distances between the blades 1321 in real time in conjunction with the strength of wind up in the air and the amount of electrical energy production.

The blade control unit 131 may have a hexapod structure including 6 actuators. The hexapod structure is a structure including six degrees of freedom, which may allow the blade control unit 131 to operate with precision. However, the structure of the blade control unit 131 is not limited to this, and the number of degrees of freedom may be variously changed as necessary.

The aero wind power generation device 1 may be formed by coupling the blades 1321 and the power generation unit 13 in an integrated fashion. The blades 1321 may be vertical wind blades, one end portion of which is coupled to an upper end portion of the power generation unit 13, and the other end portion thereof is coupled to a lower end portion of the power generation unit 13. That is, one end portion of the blades 1321 may be coupled to an external surface of the rotating unit 132, and the other end portion of the blades 1321 may be coupled to an external surface of the motor unit 133. The blades 1321 may be coupled at predetermined intervals along an external surface of the power generation unit 13. For example, six blades 1321 may be coupled at equal intervals along the external surface of the power generation unit 13.

The blades 1321 may be made of high-density urethane or aluminum. Also, the shape, type, and number of blades 1321 may vary depending on weather conditions and location.

Figure 2:
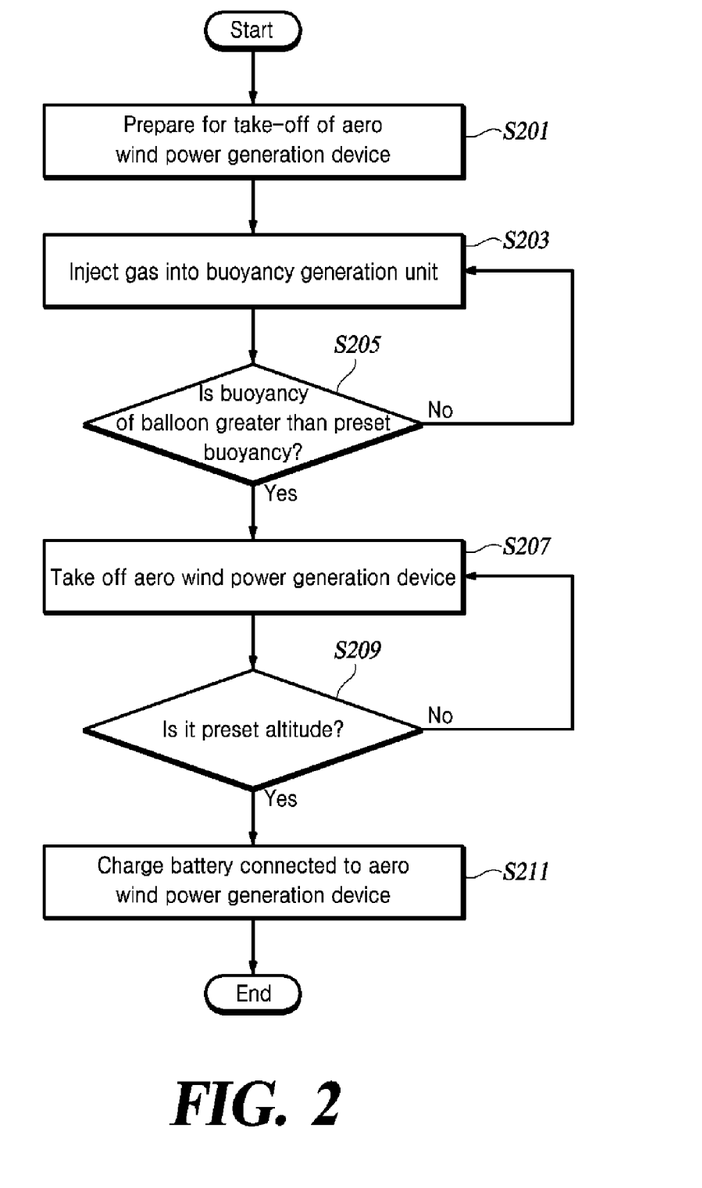
FIG. 2 is a flowchart for a control method of a take-off process of an aero wind power generation device according to an exemplary embodiment of the present disclosure.

FIG. 2 is a flowchart for a control method of a take-off process of an aero wind power generation device according to an exemplary embodiment of the present disclosure.

Referring to FIG. 2, the control method of the aero wind power generation device 1 of the present disclosure may include a take-off standby process (S201). It is possible to release a lock of the aero wind power generation device 1 coupled to a housing of a vehicle or a charging station, and release a wireless charging of the aero wind power generation device 1. A motor of the housing may be driven to assist the take-off of the aero wind power generation device 1. To move the aero wind power generation device 1 to a preset position, the motor of the housing may control a piston configured to move the aero wind power generation device 1. By operating a winch connected to the cable 14, it is possible to assist the movement of the aero wind power generation device 1. By raising or lowering the piston, the gas inlet of the buoyancy generation unit 12 may be adjusted to coincide with an inlet nozzle of the housing. The drone wings 111 may be opened to be provided for take-off.

When the preparation for take-off of the aero wind power generation device 1 is completed, helium gas may be injected into the buoyancy generation unit 12 (S203). The side cover 121 may be opened, and helium gas may be injected into the balloon 122. The controller may be configured to determine the buoyancy of the balloon 122 into which the helium gas is injected, and determine whether the buoyancy of the balloon 122 is greater than a preset buoyancy (S205). The preset buoyancy is a sufficient degree of buoyancy to float the aero wind power generation device 1 in the air. When the buoyancy force of the balloon 122 is smaller than the preset buoyancy, helium gas may be additionally injected into the balloon 122.

When the controller determines that the buoyancy of the balloon 122 has reached a preset buoyancy, the aero wind power generation device 1 may be taken off (S207). The drone motor 113 may operate so that the aero wind power generation device 1 takes off. Ultra-wideband (UWB) communication may be used to determine a three-dimensional relative distance to the housing of the vehicle or charging station. By determining the three-dimensional relative distance to the housing, the aero wind power generation device 1 may be taken off to a preset altitude. The preset altitude is an altitude at which the aero wind power generation device 1 may produce electrical energy with maximum efficiency in consideration of weather conditions and the like.

When the aero wind power generation device 1 does not rise to the preset altitude (S209), the aero wind power generation device 1 continues to rise until reaching the preset altitude. When the aero wind power generation device 1 rises to a preset altitude (S209), the battery of the vehicle or charging station connected to the aero wind power generation device may be charged (S211). Electrical energy may be produced by use of the power generation unit 13. The aero wind power generation device 1 may produce electrical energy by rotating the blade 1321. In the present instance, the blade control unit 131 may control the heights, surface areas, and angles of the blades 1321 and the distances between the blades 1321 in real time in conjunction with the strength of wind up in the air and the amount of electrical energy production to efficiently produce electrical energy.

Figure 3:
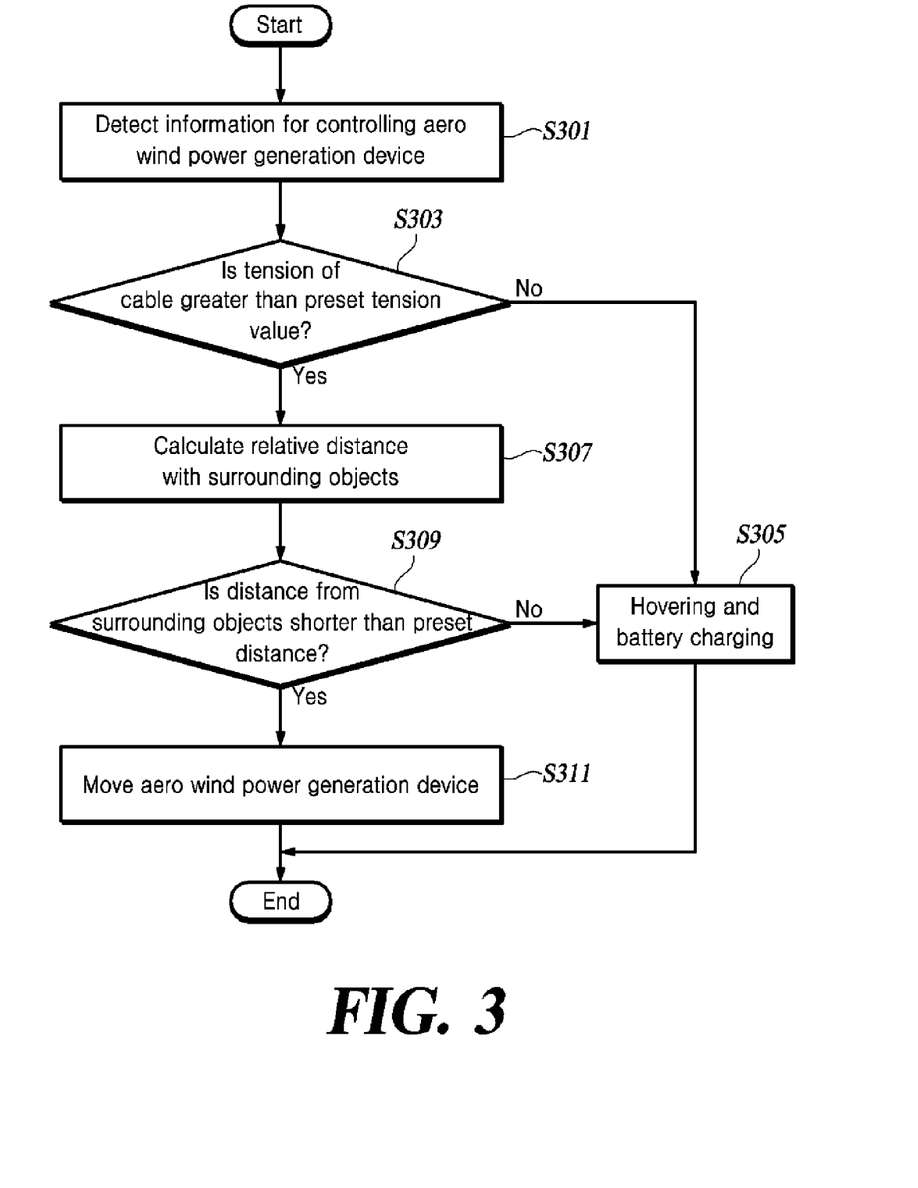
FIG. 3 is a flowchart for a control method of a position of an aero wind power generation device according to an exemplary embodiment of the present disclosure.

FIG. 3 is a flowchart for a control method of a position of an aero wind power generation device according to an exemplary embodiment of the present disclosure.

Referring to FIG. 3, the method of controlling the aero wind power generation device 1 of the present disclosure may include a process of detecting information for controlling the aero wind power generation device 1 (S301). Data of the sensor unit 115 may be monitored. For example, it is possible to monitor information such as a camera image, gyro information, wind speed, humidity, atmospheric pressure and acceleration around the aero wind power generation device 1.

A charging amount of the charging circuit of the housing may be monitored. For example, it is possible to monitor the charge amount of the battery of a vehicle or a charging station, the remaining amount of the battery for charging the aero wind power generation device 1, and the tension of a winch.

It is possible to monitor the data of a power data monitoring circuit provided in the aero wind power generation device 1. For example, it is possible to monitor the state of an inverter, a rotor and a stator of the power generation unit 13, and the amount of production of electrical energy of the aero wind power generation device 1.

To move the aero wind power generation device 1, it may be determined whether the tension of the cable 14 is greater than a preset tension value (S303). Herein, the preset tension value may be the maximum tension value of the cable 14 in consideration of a length of the cable 14 and weather conditions. When the tension of the cable 14 is smaller than the preset tension value, the aero wind power generation device 1 may be hovered and the battery of a vehicle or a charging station may be charged (S305).

When the tension of the cable 14 is greater than the preset tension value, a relative distance with the surrounding objects may be determined for the movement of the aero wind power generation device 1 (S307). The sensor unit 115 may be used to monitor three-dimensional information around the aero wind power generation device 1, and the relative distance between the aero wind power generation device 1 and the surrounding objects may be determined using the monitored information.

When the relative distance between the aero wind power generation device 1 and the surrounding objects is equal to or greater than a preset distance (S309), the aero wind power generation device 1 may be hovered and the battery of a vehicle or a charging station may be charged (S305). When the relative distance between the aero wind power generation device 1 and the surrounding objects is shorter than a preset distance (S309), the aero wind power generation device 1 may be moved (S311). Herein, the preset distance refers to a distance where the aero wind power generation device 1 is highly likely to collide with a surrounding object. For example, the relative distance between the aero wind power generation device 1 and the surrounding objects may be about 10 m.

When moving the aero wind power generation device 1, it is possible to move the aero wind power generation device 1 within a range so that the tension of the cable 14 is maintained in a range smaller than a preset tension value.

Figure 4:
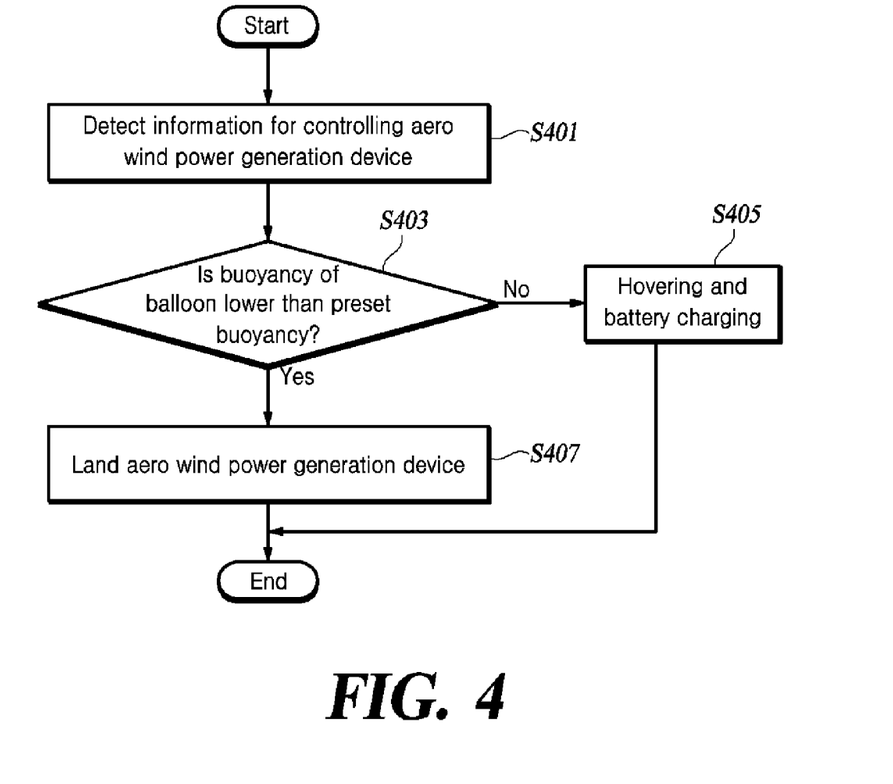
FIG. 4 is a flowchart for an emergency control method of an aero wind power generation device according to an exemplary embodiment of the present disclosure.

FIG. 4 is a flowchart for an emergency control method of an aero wind power generation device according to an exemplary embodiment of the present disclosure.

Referring to FIG. 4, the control method of the aero wind power generation device 1 of the present disclosure may include a process of detecting information for controlling the aero wind power generation device 1 (S401). As described above, it is possible to monitor the data of the sensor unit 115, a charging amount of the charging circuit of the housing, and data of the power data monitoring circuit provided in the aero wind power generation device 1.

An emergency such as damage to the balloon 122 may occur while the aero wind power generation device 1 is hovering or moving in the air. It may be determined whether the buoyancy of the balloon 122 is lower than a preset buoyancy value (S403). Here, the preset buoyancy value refers to the buoyancy of a balloon configured for maintaining the hovering and movement of the aero wind power generation device 1.

When the buoyancy of the balloon 122 is higher than the preset buoyancy value, the aero wind power generation device 1 may be hovered and the battery of a vehicle or a charging station may be charged (S405).

When the buoyancy of the balloon 122 is lower than the preset buoyancy value, the aero wind power generation device 1 may be landed (S407). The aero wind power generation device 1 may be stably landed by driving the drone motor 113 of the drone unit 11 with the maximum power and controlling the cable 14 with the maximum tension value. By use of a winch of the cable 14, the cable 14 may be controlled to the maximum tension value, and the aero wind power generation device 1 may be landed. By docking the aero wind power generation device 1 to the housing, the aero wind power generation device 1 may be landed.

Figure 5:
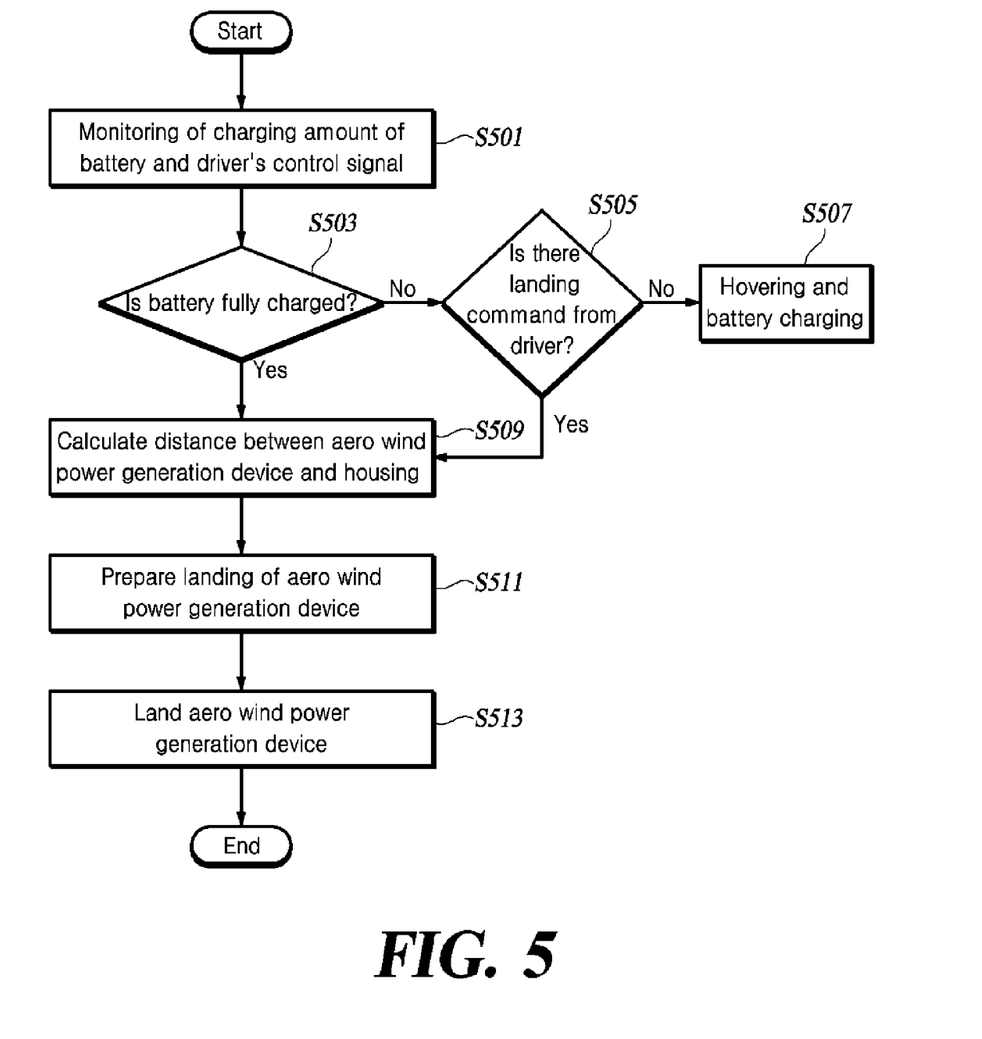
FIG. 5 is a flowchart for a control method of a landing process of an aero wind power generation device according to an exemplary embodiment of the present disclosure.

FIG. 5 is a flowchart for a control method of a landing process of an aero wind power generation device according to an exemplary embodiment of the present disclosure.

Referring to FIG. 5, the control method of the aero wind power generation device 1 of the present disclosure may include a process of determining whether the aero wind power generation device 1 is landed (S501). It is possible to determine whether the aero wind power generation device 1 has landed by monitoring a charging amount of a battery of a vehicle or a charging station or a driver's signal. For example, it is possible to determine whether to land by comparing the target charging amount and the real-time charging amount of the battery.

When the battery of the vehicle or charging station is not fully charged (S503) and there is no landing command from a driver (S505), the aero wind power generation device 1 may be hovered and the battery of a vehicle or a charging station may be charged (S507).

When the battery of the vehicle or charging station is fully charged (S503) or there is a landing command from a driver (S505), the aero wind power generation device 1 may be landed. To land the aero wind power generation device 1, the distance between the aero wind power generation device 1 and the housing of the vehicle or charging station may be determined (S509).

The control method of the aero wind power generation device 1 may include a process of preparing a landing of the aero wind power generation device 1 (S511). A winch connected to the cable 14 may be operated to assist the landing of the aero wind power generation device 1. Helium gas may be released from the buoyancy generation unit 12 using a tube for releasing helium gas provided inside the cable 14.

The method of controlling the aero wind power generation device 1 may include a process of landing of the aero wind power generation device 1 (S513). The aero wind power generation device 1 may be docked to a housing of a vehicle or a charging station. The residual helium gas remaining in the buoyancy generation unit 12 may be released using an outlet nozzle. Thereafter, the side cover 121 of the buoyancy generation unit 12 is closed, and the drone wings 111 of the drone unit 11 may be collapsed. A motor of the housing may be driven to assist the landing of the aero wind power generation device 1. To move the aero wind power generation device 1 to a preset position, the motor of the housing may control a piston configured to move the aero wind power generation device 1. By operating a winch connected to the cable 14, it is possible to assist the movement of the aero wind power generation device 1. The aero wind power generation device 1 may be moved to an initial position by rotating the motor and lowering the piston opposite to the time of take-off. Itis possible to couple and lock the aero wind power generation device 1 to the housing of the vehicle or charging station.

According to an exemplary embodiment of the present disclosure, an aero wind power generation device may be mounted in a vehicle and has an effect of converting wind power energy into electrical energy and charging the vehicle regardless of time and place.

According to an exemplary embodiment of the present disclosure, an aero wind power generation device has the effect of effectively producing electrical energy by use of high-altitude, high-speed winds and moving depending on weather conditions.

Although it is described that each process is sequentially executed in the flowchart/timing diagram of the present specification, this is merely illustrative of the technical idea of an exemplary embodiment of the present disclosure. In other words, those of ordinary skill in the art to which an exemplary embodiment of the present disclosure pertains may change the order described in the flowchart/timing diagram within the range that does not deviate from the essential characteristics of an exemplary embodiment of the present disclosure and perform the same, or apply various modifications and variations to parallel execution of one or more processes among each process. Hence, the flowchart/timing diagram is not limited to a time-series order.

Various embodiments of the systems and techniques described herein may be realized by digital electronic circuits, integrated circuits, field programmable gate arrays (FPGAs), application specific integrated circuits (ASICs), computer hardware, firmware, software, and/or a combination thereof. These various embodiments may include being implemented in one or more computer programs executable on a programmable system. The programmable system includes at least one programmable processor (which may be a special purpose processor or a general purpose processor) coupled to receive data and instructions from and transmit data and instructions to a storage system, at least one input device, and at least one output device. Computer programs (also known as programs, software, software applications or code) contain instructions for a programmable processor and are stored on a "computer-readable recording medium."

addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling an aero wind power generation apparatus, the method comprising:
    preparing for take-off of the aero wind power generation apparatus;
    injecting gas into a buoyancy generation unit of the aero wind power generation apparatus;
    taking off the aero wind power generation apparatus using a drone unit of the aero wind power generation apparatus and the buoyancy generation unit of the aero wind power generation apparatus; and
    charging a battery of the aero wind power generation apparatus using the aero wind power generation apparatus,
    wherein the aero wind power generation apparatus comprises:
        the buoyancy generation unit connected to the drone unit and including a side cover configured to open or close and a balloon provided inside the side cover, wherein the buoyancy generation unit is configured to enable injection of the gas into or release of the gas from the balloon; and
        a power generation unit connected to the buoyancy generation unit and including:
            a rotating unit with a plurality of blades;
            a blade control unit configured for adjusting a state of the blades; and
            a motor unit engaged to the rotating unit and configured for converting kinetic energy transferred from the rotating unit into electrical energy.

2. The method of claim 1, wherein the preparing for take-off of the aero wind power generation apparatus includes:
    unlocking the aero wind power generation apparatus and moving the aero wind power generation apparatus to a preset position; and
    spreading drone wings of the drone unit.

3. The method of claim 2, wherein the moving of the aero wind power generation apparatus to the preset position includes operating a winch of a cable of the aero wind power generation apparatus and controlling a piston configured to move the aero wind power generation apparatus.

4. The method of claim 1,
    wherein the gas is helium gas, and
    wherein the injecting of the gas into the buoyancy generation unit of the aero wind power generation apparatus includes:
        opening the side cover of the buoyancy generation unit; and
        injecting the helium gas into the balloon of the buoyancy generation unit.

5. The method of claim 4,
    wherein the injecting of the gas into the buoyancy generation unit of the aero wind power generation apparatus further includes:
        determining buoyancy of the balloon into which the helium gas is injected; and
        determining whether the buoyancy of the balloon is greater than a preset buoyancy.

6. The method of claim 1, wherein the charging of the battery includes:
    moving the aero wind power generation apparatus to a preset altitude; and
    operating the blades of the aero wind power generation apparatus.

7. The method of claim 6, wherein the moving of the aero wind power generation apparatus to the preset altitude includes operating the drone unit, and determining a relative distance with a housing of the aero wind power generation apparatus using an ultra-wide band (UWB) sensor.

8. The method of claim 6, wherein the operating of the blades of the aero wind power generation apparatus includes adjusting one or more of heights, surface areas, and angles of the blades and distances between the blades.

9. A method of controlling an aero wind power generation apparatus, the method comprising:
    detecting information for control of the aero wind power generation apparatus;
    determining, by a controller, whether tension of a cable of the aero wind power generation apparatus is higher than a preset tension value; and
    moving, by the controller, the aero wind power generation apparatus when the controller concludes that the tension is higher than the preset tension value,
    wherein the aero wind power generation apparatus comprises:
        a buoyancy generation unit connected to a drone unit and including a side cover configured to open or close and a balloon provided inside the side cover, wherein the buoyancy generation unit is configured to enable injection of gas into or release of the gas from the balloon; and
        a power generation unit connected to the buoyancy generation unit and including:
            a rotating unit with a plurality of blades;
            a blade control unit configured for adjusting a state of the blades; and
            a motor unit engaged to the rotating unit and configured for converting kinetic energy transferred from the rotating unit into electrical energy.

10. The method of claim 9, wherein the detecting of the information for control of the aero wind power generation apparatus includes detecting data of a sensor unit of the aero wind power generation apparatus, and information on at least one of a charging amount of a battery of the aero wind power generation apparatus and an amount of energy production of the aero wind power generation apparatus.

11. The method of claim 9, wherein the moving of the aero wind power generation apparatus includes detecting a surrounding object of the aero wind power generation apparatus and determining a relative distance between the aero wind power generation apparatus and the surrounding object.

12. The method of claim 11, wherein the moving of the aero wind power generation apparatus further includes moving the aero wind power generation apparatus within a range in which the tension is smaller than the preset tension value when the controller concludes that the relative distance is shorter than a preset distance.

13. The method of claim 9, further including determining, by the controller, whether buoyancy of the aero wind power generation apparatus is lower than a preset buoyancy value.

14. The method of claim 13, further including landing the aero wind power generation apparatus when the controller concludes that the buoyancy is lower than the preset buoyancy value.

15. The method of claim 14, wherein the landing of the aero wind power generation apparatus further includes using the drone unit of the aero wind power generation apparatus and a winch of a cable of the aero wind power generation apparatus.

16. A method of controlling an aero wind power generation apparatus, the method comprising:
  determining whether the aero wind power generation apparatus has landed;
  preparing the aero wind power generation apparatus to land on a housing; and
  landing the aero wind power generation apparatus on the housing,
  wherein the aero wind power generation apparatus comprises:
    a buoyancy generation unit connected to a drone unit and including a side cover configured to open or close and a balloon provided inside the side cover, wherein the buoyancy generation unit is configured to enable injection of gas into or release of the gas from the balloon; and
    a power generation unit connected to the buoyancy generation unit and including:
      a rotating unit with a plurality of blades;
      a blade control unit configured for adjusting a state of the blades; and
      a motor unit engaged to the rotating unit and configured for converting kinetic energy transferred from the rotating unit into electrical energy.

17. The method of claim 16, wherein the determining whether the aero wind power generation apparatus has landed includes concluding that the aero wind power generation apparatus is to be landed when at least one of a first condition in which a battery of the aero wind power generation apparatus is fully charged and a second condition in which the aero wind power generation apparatus receives a landing command of a driver is satisfied.

18. The method of claim 16,
  wherein the gas is helium gas, and
  wherein the preparing of the aero wind power generation apparatus to land on the housing includes:
    determining a distance between the aero wind power generation apparatus and the housing; and
    releasing the helium gas from the buoyancy generation unit of the aero wind power generation apparatus.

19. The method of claim 16, wherein the landing of the aero wind power generation apparatus on the housing includes:
  docketing the aero wind power generation apparatus to the housing;
  releasing residual helium gas of the buoyancy generation unit; and
  collapsing drone wings of the drone unit of the aero wind power generation apparatus.

20. The method of claim 19, wherein the landing of the aero wind power generation apparatus on the housing further includes moving the aero wind power generation apparatus to an initial position and locking the aero wind power generation apparatus.

* * * * *